(12) United States Patent
Shiraishi et al.

(10) Patent No.: US 11,964,720 B2
(45) Date of Patent: Apr. 23, 2024

(54) VIBRATION-DAMPING STRUCTURE FOR VEHICLE STEERING WHEEL, AND VEHICLE STEERING WHEEL DEVICE

(71) Applicant: Autoliv Development AB, Vargarda (SE)

(72) Inventors: Norihisa Shiraishi, Kanagawa (JP); Kazuhiro Abe, Kanagawa (JP); Takayuki Kura, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 406 days.

(21) Appl. No.: 17/310,458

(22) PCT Filed: Jan. 30, 2020

(86) PCT No.: PCT/JP2020/003401
§ 371 (c)(1),
(2) Date: Aug. 4, 2021

(87) PCT Pub. No.: WO2020/162315
PCT Pub. Date: Aug. 13, 2020

(65) Prior Publication Data
US 2022/0105982 A1    Apr. 7, 2022

(30) Foreign Application Priority Data
Feb. 8, 2019    (JP) ................. 2019-021796

(51) Int. Cl.
*B62D 7/22* (2006.01)
*B60R 21/203* (2006.01)
(Continued)

(52) U.S. Cl.
CPC .......... *B62D 7/222* (2013.01); *B60R 21/2037* (2013.01); *B62D 1/11* (2013.01); *F16F 15/12* (2013.01)

(58) Field of Classification Search
CPC .. B62D 7/222; B62D 1/11; F16F 15/12; F16F 3/10; F16F 15/085; B60R 21/2037; B60R 21/203
See application file for complete search history.

(56) References Cited

U.S. PATENT DOCUMENTS 9,195,257 B2 * 11/2015 Miyahara ................. G05G 1/10
10,422,400 B2 * 9/2019 Kato .......................... F16F 7/10
(Continued)

FOREIGN PATENT DOCUMENTS

| JP | 2006-228700 A | 8/2006 |
|---|---|---|
| JP | 2009-202859 A | 9/2009 |

(Continued)

OTHER PUBLICATIONS

Japanese Patent No. JP 2015145173 to Hock et al published on Aug. 13, 2015.*

*Primary Examiner* — Pamela Rodriguez
(74) *Attorney, Agent, or Firm* — Foley & Lardner LLP

(57) ABSTRACT

An airbag module that serves as a damper mass mounted to the steering wheel surrounding the center of steering of the steering wheel via vibration damping parts, the vehicle steering wheel structure damping steering wheel vibration, wherein the vibration damping parts includes at least a first vibration damping part positioned upward from the center of steering and a second vibration damping part positioned downward from the center of steering with reference to a neutral position of the steering wheel and the spring constant or elastic modulus of the first vibration damping part is set lower than the spring constant or elastic modulus of the second vibration damping part.

8 Claims, 7 Drawing Sheets

(51) Int. Cl.
*B62D 1/11* (2006.01)
*F16F 15/12* (2006.01)

(56) References Cited

U.S. PATENT DOCUMENTS

| | | | |
|---|---|---|---|
| 10,926,698 B2* | 2/2021 | Gothekar | ............... B62D 7/222 |
| 11,618,501 B2* | 4/2023 | Shiraishi | ............... B62D 7/222 |
| | | | 74/552 |
| 2013/0026741 A1* | 1/2013 | Onohara | ............. B60R 21/2037 |
| | | | 74/552 |
| 2020/0017057 A1* | 1/2020 | Hirota | ................. B60R 21/2037 |

FOREIGN PATENT DOCUMENTS

| | | |
|---|---|---|
| JP | 2015-160438 A | 9/2015 |
| JP | WO-2017154571 A1 * | 9/2017 |

* cited by examiner

VIBRATION-DAMPING STRUCTURE FOR VEHICLE STEERING WHEEL, AND VEHICLE STEERING WHEEL DEVICE

TECHNICAL FIELD

The present invention relates to a vehicle steering wheel vibration damping structure and steering wheel device capable of effectively damping incited vibration occurring in the steering wheel and contributing to vibration reduction in both low and high frequency bands.

BACKGROUND TECHNOLOGY

For example, Patent Document 1 is known as a vibration control technology for a vehicle steering wheel. The "steering wheel vibration reducing structure" of Patent Document 1 addresses the problem of effectively reducing steering wheel vibration with a dynamic damper without affecting the operability of a horn switch, supported by a slider movable in an axial direction via a coil spring on a holder of the steering wheel, and an airbag module is supported by the slider via a damper spring to be movable in a nearly perpendicular direction. Since the coil spring does not affect the vibration of the airbag module in a nearly perpendicular direction, the spring constant of the coil spring can be set to a value suitable for the operation of the horn switch and the spring constant of the damper spring to a value suitable for the operation of the dynamic damper, and the dynamic damper makes it possible to effectively reduce the vibration in nearly a perpendicular direction of the steering wheel without affecting the operability of the horn switch.

PRIOR ART DOCUMENTS

Patent Documents

Patent Document 1: Japanese Unexamined Patent Application No. 2009-202859

SUMMARY OF THE INVENTION

Problem to be Solved by the Invention

The vibration modes generated in the steering wheel include (1) vertical vibration caused by the engine in the low frequency band of 30 to 50 Hz and (2) deformation resonance of the steering wheel in the high frequency band of 70 to 90 Hz.

In a vibration mode of the low frequency band, vibration displacement Js of a steering wheel a and vibration displacement Jm of an airbag module b are opposite to each other in the vertical direction as illustrated in FIG. 8. These types of vibrations can be considerably dampened using a dynamic damper arranged between the steering wheel a and the airbag module b as illustrated in the background art.

In contrast, in a vibration mode of the high frequency band, as illustrated in FIG. 9, vibration displacement Ks is generated in the steering wheel a in the opposite direction to the vehicle front/rear direction above and below a steering shaft c positioned on the center of steering axis, which agitates the steering wheel a. Therefore, vibration displacement Km occurs on the airbag module b above and below the steering shaft c in a direction opposite to the vibration displacement Ks of the steering wheel. For this manner of vibration, simply arranging dampers of the same performance around the steering shaft c positioned on an axis line passing through the center of steering, as in the background art, is not sufficient to effectively control vibration of the steering wheel a.

In light of the conventional problems described above, an object of the present invention is to provide a vehicle steering wheel vibration damping structure and steering wheel device which is capable of effectively damping induced vibration generated in the steering wheel that contributes to reducing vibration in both low frequency bands and high frequency bands.

Means for Solving the Problems

The vehicle steering wheel vibration damping structure according to the present invention has an airbag module that serves as a damper mass mounted to the steering wheel surrounding the center of steering of the steering wheel via vibration damping parts, the vehicle steering wheel structure damping steering wheel vibration, wherein the vibration damping parts includes at least a first vibration damping part positioned upward from the center of steering and a second vibration damping part positioned downward from the center of steering with reference to a neutral position of the steering wheel and the spring constant or elastic modulus of the first vibration damping part is set lower than the spring constant or elastic modulus of the second vibration damping part.

The first vibration damping part includes damping rubber arranged symmetrically on both left and right sides of the center of steering, the second vibration damping part includes damping rubber, and the hardness of the damping rubber for the first vibration damping part is lower than the hardness of the damping rubber for the second vibration damping part It is desirable that a spring is attached to the steering wheel and elastically supporting each of the vibration damping parts individually, where the spring constant of the first spring elastically supporting the first vibration damping part is set lower than the spring constant of the second spring elastically supporting the second vibration damping part.

Deadweight is desirably provided positioned at the installation height or positioned near the installation height of the second vibration damping part. The deadweight is preferably provided below the installation height position of the second vibration damping part instead of at the installation height position of the second vibration damping part.

The airbag module desirably has a module base on which the vibration damping parts are attached, and where the module base is formed such that the upper region above the center of steering is lighter than the lower region, with reference to the neutral position of the steering wheel. The upper region of the module base is preferably made of synthetic resin and the lower region is preferably made of metal.

The vehicle steering wheel device of the present invention is provided with the vehicle steering wheel vibration damping structure described above.

Effect of the Invention

The vehicle steering wheel vibration damping structure and steering wheel device of the present invention can effectively damp incited vibrations generated in a steering wheel and can contribute to reducing vibrations in both low frequency bands and high frequency bands.

MODE FOR CARRYING OUT THE INVENTION

Figure 1:
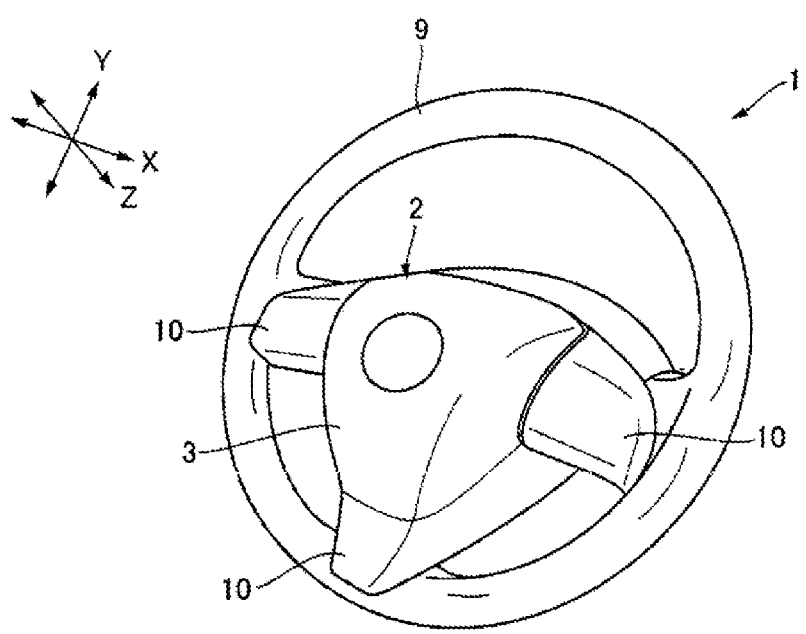
FIG. 1 is a schematic perspective view of a steering wheel to which the steering wheel vibration damping structure according to the present invention is applied.

Hereinafter, preferred embodiments of a vehicle steering wheel vibration damping structure and steering wheel device according to the invention will be described in detail with reference to accompanying drawings. FIG. 1 is an overview illustrating a steering wheel 1 to which the vehicle steering wheel vibration damping structure according to the present invention is applied.

FIG. 1 illustrates an overall perspective view of a steering wheel 1. In the following diagrams, including FIG. 1, each direction is illustrated on the assumption that the steering position of the steering wheel 1 attached to the steering shaft of the vehicle (not shown) is in a neutral position.

With respect to the steering position, the "neutral position of the steering wheel 1" refers to the position of the steering wheel 1 when the vehicle is moving straight ahead and no force is applied to the steering wheel 1 and the steering wheel 1 is positioned in the natural state thereof.

For the coordinate system illustrated in FIG. 1, the Z-axis is roughly defined as the direction of the steering shaft, down towards the front wheels of the vehicle and up towards the steering wheel 1. The 12 o'clock direction (upward) to 6 o'clock direction (downward) of the analog 12-hour clock in the plane orthogonal to the Z-axis is the Y-axis, and the 9 o'clock direction (leftward) to 3 o'clock direction (rightward) is the X-axis. Otherwise, the side seen from the side of the driver shall be described as the front side and the opposite side as the back side.

The steering wheel 1 is installed on the driver's seat of the vehicle, is connected to the steering shaft, and transmits the operating force of the driver to the steering gear and the like. The steering wheel 1 is operated at a steering angle with the steering shaft as a center of steering S.

In the description below, the "center of steering S of the steering wheel 1" refers to the intersection (preferably orthogonal) where a central axis around which the steering shaft rotates (hereinafter referred to as the steering shaft rotation center axis; Z-axis direction) intersects with a plane formed by an attachment plate 13, retainer ring 14, housing 4, and the like of the airbag module 2 module base 7, and the vicinity thereof.

For the "center of steering S", "up" and "down" refer to a plane (for example, the ZX plane in FIG. 1) extending in the direction of the rotation center axis at the position of the center of steering S on the steering shaft rotation center axis described above extending infinitely as an axis and including a straight line orthogonal to the rotation center axis in the horizontal direction. With respect to the plane, the ceiling direction of the vehicle is the "up" direction and the floor direction is the "down" direction.

The terms "left" and "right" with respect to the "center of steering S" means that when a plane (for example, the ZY plane in FIG. 1) is assumed to extend in the direction of the rotation center axis at the position of the center of steering S on the steering shaft rotation center axis, including a straight line orthogonal to the rotation center axis, when facing in the forward direction of the vehicle, the "left" direction is taken as left direction and when facing in the forward direction of the vehicle, the "right" direction is taken as the right direction.

With respect to vibration damping parts 19P, 19Q, and deadweight 20 described below, the "height position" refers to the vertical distance from the steering shaft rotation center axis. The vertical position of the steering shaft rotation center axis varies along the axis direction, for example, between the steering angle center S position and the position away from the steering angle center S. In other words, the vertical position of the rotation center axis, which defines the "height position" in terms of vertical distance, varies in the axial direction. Therefore, the "height position" described above varies depending on the position of the steering shaft rotation center axis.

"Modulus of elasticity" is a property of a material, such as Young's modulus. The "spring constant" indicates the hardness of a spring. In both cases, the higher the value, the "harder" the characteristic is, and the lower the value, the "softer" the characteristic is. Therefore, (first vibration damping part 19P)<(second vibration damping part 19Q) means that the first vibration damping part 19P is softer than the second vibration damping part 19Q.

Figure 2:
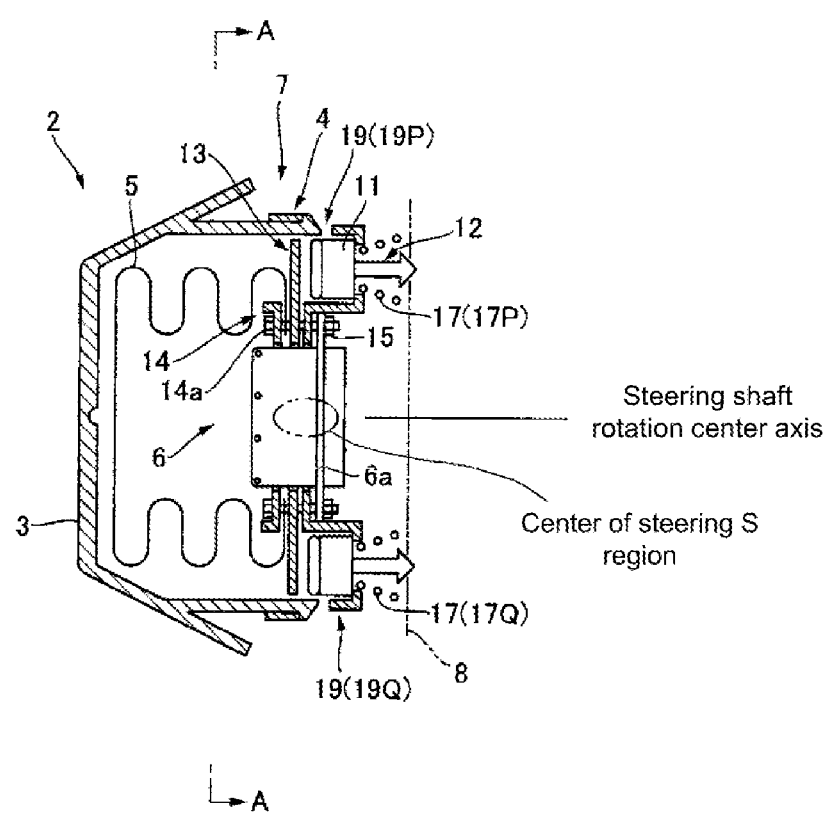
FIG. 2 is a side cross-sectional view illustrating a suitable embodiment of a vehicle steering wheel vibration damping structure and steering wheel device according to the present invention.
Figure 3:
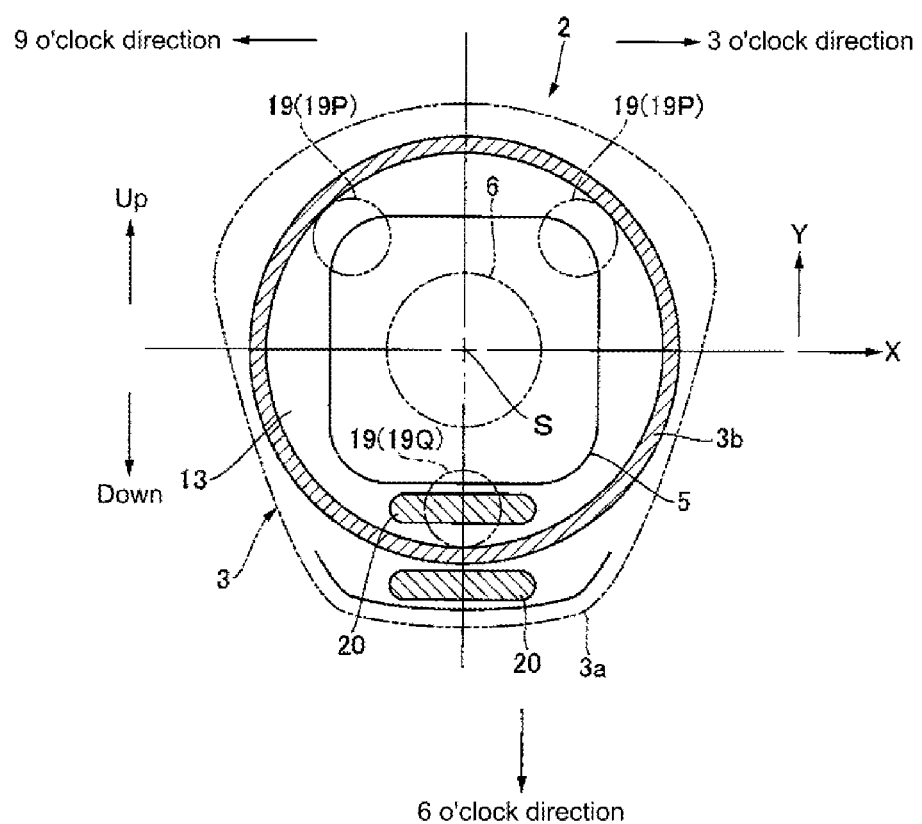
FIG. 3 is a schematic cross-sectional view taken along line A-A in FIG. 2.

An airbag module 2, which functions as a driver's airbag in an emergency, is mounted in the center of the steering wheel 1, as illustrated in FIG. 1 to FIG. 3. Although this will be explained below, the airbag module 2 also functions as a horn switch under normal operation that a driver pushes when causing the horn to sound.

The airbag module 2 at a side of a driver is covered with a horn cover 3 made of resin which functions as a design surface. As illustrated in FIG. 1 to FIG. 4, a module base 7, which constitutes the base of the airbag module, is provided at the back of the horn cover 3.

An airbag cushion 5, which is attached to the module base 7 and deployed and inflated in an emergency, is folded and stowed inside the horn cover 3. An inflator 6, which is stowed in the airbag cushion 5, is attached on the module base 7.

When a signal is transmitted from a sensor of a vehicle in an emergency, inflator gas is supplied from the inflator 6 to the airbag cushion 5, and the airbag cushion 5 tears open the horn cover 3 and deploys and expands into the interior space of the vehicle and restrains the driver.

The base part of the steering wheel 1 is composed of a cored bar member made of metal. The cored bar member is primarily configured to include a central boss region 8 (see FIG. 3 and the like), a circular rim 9 that the driver grips, and spokes 10 that connect the boss region 8 and the rim 9. The steering shaft is connected to the boss region 8.

In addition to the function thereof as a driver's airbag, the airbag module 2 has a function as a horn switch as described above, and also a function for reducing vibration of the steering wheel 1. The configuration that achieves these functions is described below.

Figure 4:
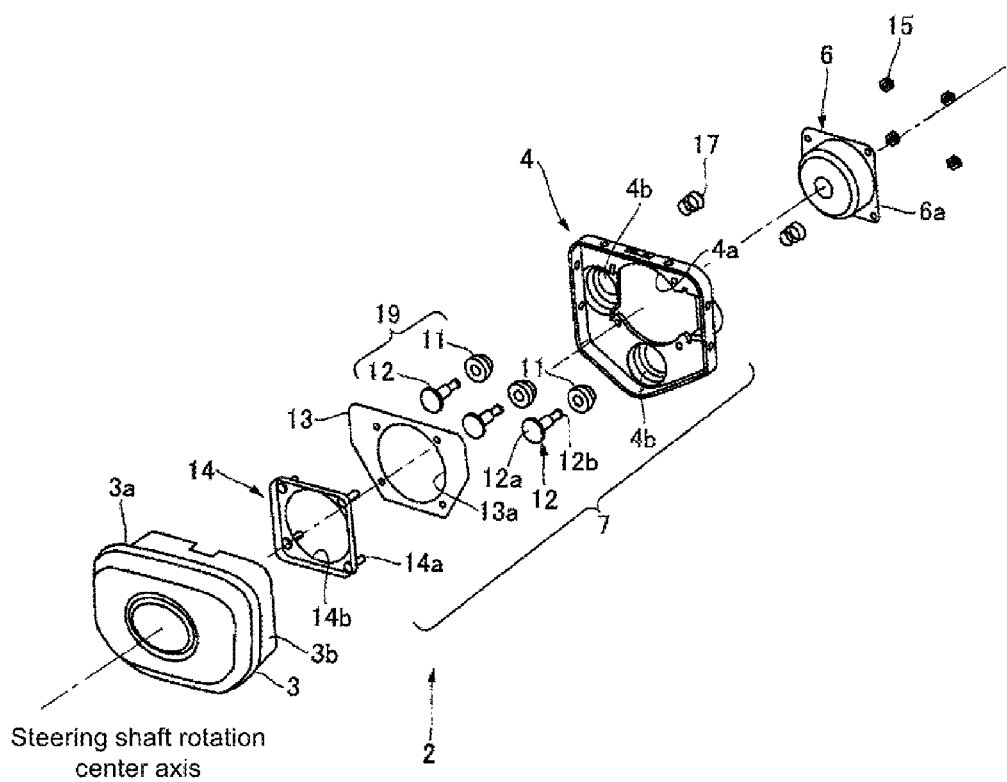
FIG. 4 is an exploded perspective view illustrating the parts composition of the vehicle steering wheel in FIG. 2.

The airbag module 2 has a module base 7 on which the airbag cushion and inflator 6 are attached, as illustrated in FIG. 2 to FIG. 4.

The module base 7 comprises a metal retainer ring 14 to which the airbag cushion 5 is attached, an attachment plate 13 made of metal which is superimposed on the back side of the retainer ring 14, and a housing 4 made of metal which is further superimposed on the back side of the attachment plate 13.

In the housing 4, an inflator insertion hole 4a is formed at a central position and three through-holes 4b are formed around this inflator insertion hole 4a in an arrangement surrounding the center of steering S (the center axis of rotation of the steering shaft) of the steering wheel 1.

The attachment plate 13 and the retainer ring 14 have holes 13a, 14b which are connected to the inflator insertion hole 4a and which position the inflator 6 in the airbag cushion 5.

The inflator 6 is inserted into the inflator insertion hole 4a from the rear side (boss region 8 side) of the housing 4, and an outer flange 6s abuts the housing 4.

A bolt 14a on the retainer ring 14 penetrates through the attachment plate 13, the housing 4, and an outer flange 6a of the inflator 6, and a nut 15 is fastened from the back side of the housing 4, thereby assembling the inflator 6 and the airbag cushion 5 to the module base 7.

The module base 7 is further provided with the horn cover 3. The horn cover 3 is formed in the shape of a hollow bowl stowing the airbag cushion 5, and a cylindrical part 3b protruding and formed from a more inner position than an outer rim part 3a is attached to the housing 4 by a locking structure 18.

The airbag module 2, which is composed of an airbag cushion 5, an inflator 6, and a horn cover 3 assembled to a module base 7, functions as a damper mass for vibration damping.

The attachment plate 13 is formed to seal the three through-holes 4b of the housing 4 and is made up of an assembly part of the vibration damping parts 19.

The vibration damping parts 19 are made up of a ring-shaped damping rubber 11 and a shaft-shaped pin body 12. The damping rubber 11 is provided by being retained in respective through-holes 4b of the housing 4 and arranged surrounding the center of steering S.

The pin body 12 is slidably inserted into the damping rubber 11, and a disk-shaped base end 12a thereof abuts the damping rubber 11 from the front side to prevent it from being dislodged, while a shaft-shaped tip 12b thereof is attached and secured to the boss region 8 of the steering wheel 1.

The through holes 4b are sealed by the attachment plate 13, and the pin body 12 attached to the boss region 8 are assembled so that they can slide against the damping rubber 11 attached to the through-holes 4b. With this configuration, the airbag module 5 is mounted to the steering wheel 1 via vibration damping parts 19 comprising a pin body 12 on the steering wheel 1 side and a damping rubber 11 on the module base 7 side.

In the vibration damping parts 19, the pin body 12 transmits vibration of the steering wheel 1 to the airbag module 2 side, the damping rubber 11 in which the pin body 12 is inserted becomes a vibration damping element, and the aforementioned airbag module 2 becomes a damper mass, which dampens the vibrations of the steering wheel 1.

Each of the pin bodies 12 protruding from the housing 4 into the boss region 8 is provided with a horn spring (coil spring) 17 there surrounding.

The horn spring 17 is mounted at one end in the boss region 8 and at the other end abutting the back side of the housing 4, thus elastically supporting the airbag module 2 from the steering wheel 1 side and also the respective vibration damping parts 19 individually in their installed position.

The horn spring 17 is installed between the airbag module 2 and the boss region 8 to ensure a gap therebetween. When the driver presses the airbag module 2 (horn cover 3) toward the steering wheel 1 during horn operation, the damping rubber 11 (airbag module 2) slides against the pin body 12 and the horn spring 17 is compressed. As a result, the contacts on the airbag module 2 side and the steering wheel 1 side are electrically connected, and the horn sounds.

When pressing of the airbag module 2 is lifted, the horn spring 17 is elastically restored such that the airbag module 2 is retracted, and thereby the contact points are separated from each other such that sounding is to be stopped.

In a suitable embodiment of the vehicle steering wheel vibration damping structure and steering wheel device according to the present invention, as illustrated in FIG. 2 and FIG. 3, three vibration damping parts 19 are arranged surrounding the center of steering S with reference to the neutral position of the steering wheel 1, of which two first vibration damping parts 19P are arranged upward from the center of steering S, on the 3 o'clock side and the 9 o'clock side, which are rightwardly and leftwardly along the X-axis direction, respectively, and one second vibration damping part 19Q is arranged downwardly from the center of steering S, on the 6 o'clock side, which is in the down direction along the Y-axis direction. The first vibration damping parts 19P are preferably arranged at equal distances in the left and right directions from the center of steering S.

Each vibration damping part 19 is individually supported elastically by the horn spring 17 as described above. The first vibration damping part 19P is supported elastically by the first horn spring 17P and the second vibration damping part 19Q is supported elastically by the second horn spring 17O.

With respect to the first and second vibration damping parts 19P, 19Q, the spring constant or elastic modulus achieved by the first vibration damping part 19P is set smaller than the spring constant or elastic modulus achieved by the second vibration damping part 19Q.

Speaking of this embodiment, there are two of the first vibration damping parts 19P, and they include damping rubber 11 symmetrically arranged on both the left and right sides of the center of steering S. The second vibration damping parts 19Q includes damping rubber 11. The hardness of the damping rubber 11 of the first vibration damping part 19P is set less than the hardness of the damping rubber 11 of the second vibration damping part 19Q.

In addition, with respect to the first and second horn springs 17P, 17Q, the spring constant of the first horn spring 17P is set smaller than the spring constant of the second horn spring 17Q.

As a result, the airbag module 2 is set to have a greater degree of freedom and ease of movement below the center of steering S with respect to the steering wheel 1 than above it, with respect to the neutral position.

By adopting this manner of configuration and changing the degree of freedom in the vertical direction of the center of steering S to facilitate movement of the airbag module 2 from the downward to the upward direction, the damping rubber 11 and the horn spring 17 can suitably provide vibration damping with regards to the high frequency band vibration behavior of the steering wheel 1 that is repeatedly agitated in the upward and downward directions.

More specifically, this can effectively dampen a vibration state, where in a high frequency band vibration mode, the steering wheel 1 vibrates above and below the central axis of rotation of the steering shaft (center of steering S) in opposite directions to the vehicle front-rear direction generating vibration that agitates the steering wheel, and the airbag module 2 displaces above and below the steering shaft in the opposite direction to the vibration displacement of the steering wheel 1.

By way of example, the Shore hardness H1 of the damping rubber of the first vibration damping part 19P is set to 18 to 35 Hs, preferably 25 Hs, and the Shore hardness H2 of the damping rubber of the second vibration damping part 19Q is set to 30 to 65 Hs, preferably 50 Hs (H1<H2), and the spring constant L1 of the first horn spring 17P is set to 10 to 25N, preferably 12N, and the spring constant L2 of the second horn spring 17Q is set to 15 to 35N, preferably 18N (L1<L2).

The hardness and spring constants may be set in any way as long as the relationships H1<H2 and L1<L2 are satisfied. On the other hand, vibration in the low frequency band described above can be reduced by the vibration damping parts 19.

Figure 5:
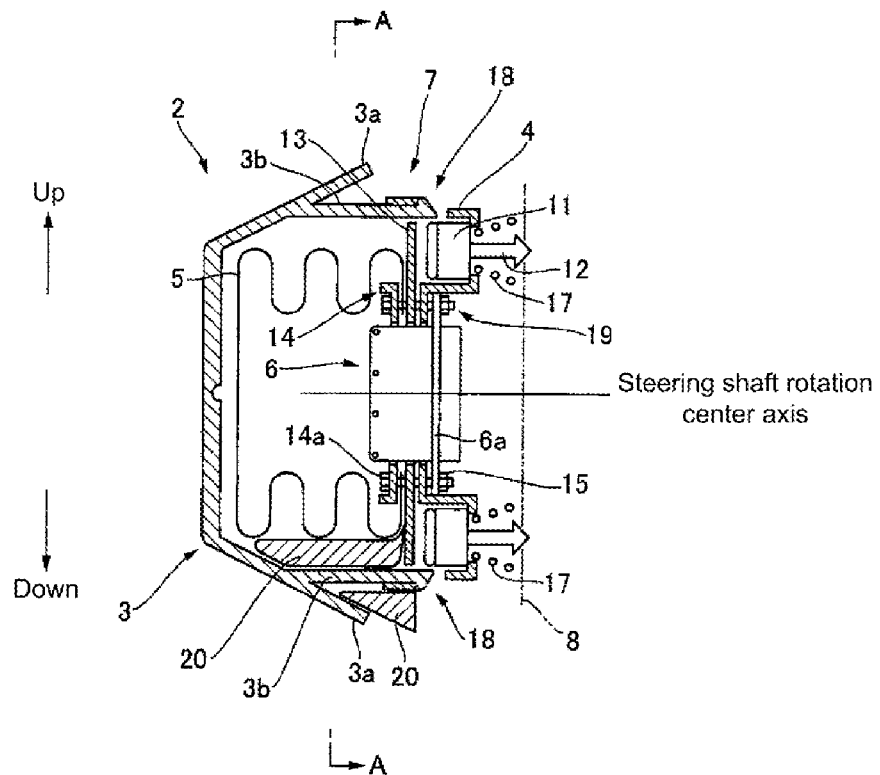
FIG. 5 is a side cross-sectional view illustrating a modified example of the vehicle steering wheel vibration damping structure and steering wheel device illustrated in FIG. 2.
Figure 6:
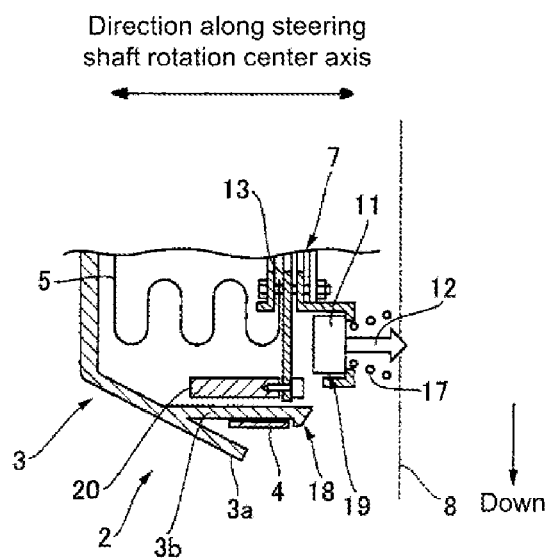
FIG. 6 is a partial cross-sectional view illustrating another modified example of the vehicle steering wheel vibration damping structure and steering wheel device illustrated in FIG. 2.
Figure 7:
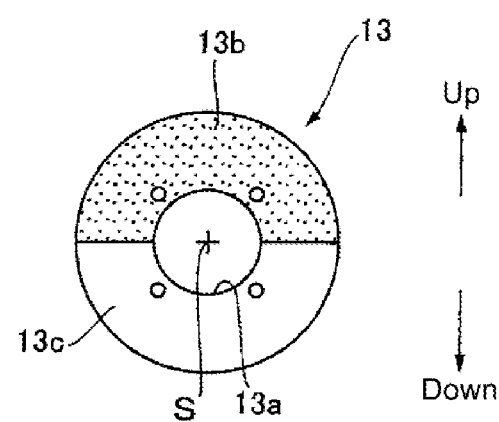
FIG. 7 is a front view of an attachment plate illustrating yet another modified example of the vehicle steering wheel vibration damping structure and steering wheel device illustrated in FIG. 2.
Figure 8:
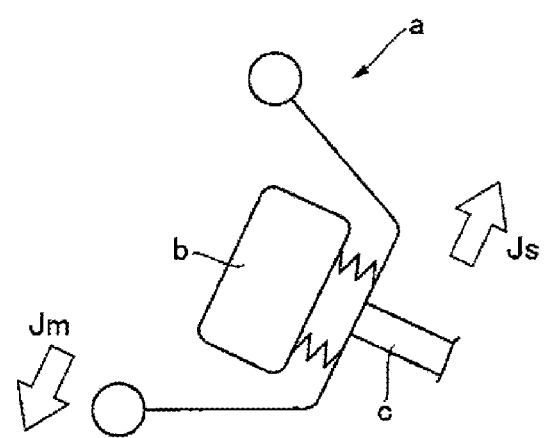
FIG. 8 is an explanatory diagram describing the vibration state of a vehicle steering wheel at a low frequency band.
Figure 9:
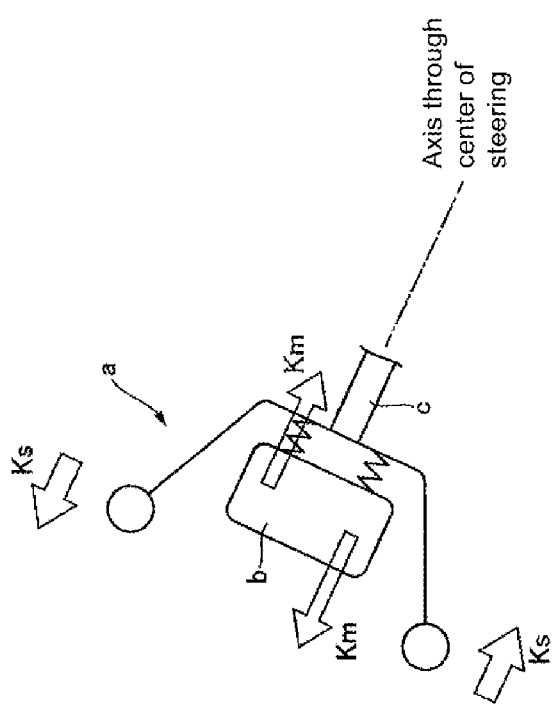
FIG. 9 is an explanatory diagram describing the vibration state of a vehicle steering wheel at a high frequency band.

FIG. 5 to FIG. 7 illustrate modified examples of the embodiment described above combined with other vibration damping configurations. Roughly, the airbag module 2 is made up of a configuration in which an upper region above the center of steering S of the steering wheel 1 is lighter than a lower region with reference to the neutral position of the steering wheel 1.

In the modified example illustrated in FIG. 5, the airbag module 2 is provided with the deadweight 20 to adjust the vibration damping characteristics.

The deadweight 20 is installed above and below the steering wheel 1 in opposite directions in the front/rear direction of the vehicle to reduce vibration in a high frequency band incited in said steering wheel 1, provided at the installation height position or near the installation height position of the vibration damping parts 19 positioned below the center of steering S with reference to the neutral position of the steering wheel 1 position.

In the example illustrated in the diagram, one of the vibration damping parts 19 is arranged downward from the center of steering S in the 6 o'clock direction, which is downward from the center of steering S in the downward direction along the Y-axis direction, and the deadweight 20 is provided corresponding to the installation height position of the vibration damping parts 19.

In the diagram, the deadweight 20 is provided placed on the cylindrical part 3b of the horn cover 3, joined to the attachment plate 13, and secured to the gap between the outer rim part 3a and the cylindrical part 3b of the horn cover 3.

The location where the deadweight 20 is installed is an example, and may be installed at any location as long as it is at the installation height position or near the installation height position of the vibration damping parts 19 positioned downward from the center of steering S with reference to the neutral position of the steering wheel 1.

In addition, this is not limited to the horn cover 3 or the attachment plate 13, and can also be provided on the housing 4.

By setting the airbag module 2 so that the upper region above the center of steering S of the steering wheel 1 is lighter than the lower region, specifically by providing deadweight 20 below the center of steering S, the high frequency band vibration behavior of the steering wheel 1 that is repeatedly incited in an upward and downward direction can be suitably reduced.

By providing the deadweight 20 in accordance with the installation height position of the vibration damping parts 19, the vibration damping parts 19 can be tuned favorably such that operation in the high frequency band can be suppressed.

On the other hand, vibration in the low frequency band described above can be reduced by the vibration damping parts 19.

In the modified example of FIG. 6, the deadweight 20 is provided below the installation height position of the vibration damping parts 19 instead of at the installation height position of the vibration damping parts 19. This enables increasing the inertial action of the deadweight 20 at the time of vibration of the steering wheel 1, and even if the deadweight 20 is lightened, a considerable vibration reduction effect can be obtained.

In addition, since the installation height positions of the vibration damping parts 19 and the deadweight 20 is differentiated, unlike the embodiment described above, the vibration reduction action of the deadweight can be applied to the low frequency band vibration caused by the vibration damping parts 19, and the vibration reduction action of the vibration damping parts 19 can be applied to the high frequency band vibration caused by the deadweight 20.

In the modified example of FIG. 7, the module base 7 is formed so that an upper region above the center of steering S is lighter than a lower region with reference to the neutral position of the steering wheel 1. In this modified example, an arrangement of the vibration damping parts 19 is not required.

The module base 7 is made up of a retainer ring 14, an attachment plate 13, and a housing 4 as described above.

All of these parts, such as the retainer ring 14, or at least any one of these parts, are formed such that the weight of the upper region above the center of steering S is lighter than the weight of the lower region. The lightness of the weight may be changed by any conventionally known method, such as by changing the materials or the dimensions of the members.

For example, as illustrated in FIG. 7, the upper region (upper half) 13b of the attachment plate 13 is made of light synthetic resin, and the lower region (lower half) 13c is made of metal that is heavy. When the parts such as the attachment plate 13 are composed of a combination of synthetic resin and metal, they can be integrally formed by in-molding or the like.

It is of course true that even such a modified example will have the same effect as the above embodiment and variation.

The weight change of the upper region and the lower region relative to the module base 7 described in the modified example of FIG. 7 can be adopted on the basis of the embodiment described above in combination with the modified example of providing the dead weight 20 illustrated in FIG. 5 and FIG. 6.

With this configuration, tuning to the frequency of the vibration damping target can be easily and freely performed, and the vibration of the steering wheel can be appropriately reduced.

The vehicle steering wheel vibration damping structure and steering wheel device described above are the preferred examples of the present invention, and embodiments other than those can also be implemented or fulfilled in various types of methods. In particular, unless otherwise described in the specification of the application, the invention is not restricted to the shapes, sizes, configurational dispositions, and the like of the parts illustrated in detail in the accompanying drawings. In addition, the expressions and terms used in the specification of the application are used for providing a description, without limiting the invention thereto, unless specifically described otherwise.

DESCRIPTION OF CODES

1 Steering wheel
2 Airbag module
7 Module base
11 Damping rubber
13 Attachment plate
13b Attachment plate upper region
13c Attachment plate lower region
17 Horn spring
17P First horn spring
17Q Second horn spring
19 Vibration damping parts
19P First vibration damping parts
19Q Second vibration damping parts
20 Deadweight
S Steering wheel center of steering

The invention claimed is:

1. A vehicle steering wheel vibration damping structure comprising:
   an airbag module that serves as a damper mass;
   a steering wheel; and,
   vibration damping parts mounting the airbag module to the steering wheel arranged surrounding the center of steering of the steering wheel,
   the vehicle steering wheel structure damping steering wheel vibration, wherein
   the vibration damping parts include at least a first vibration damping part positioned upward from the center of steering and a second vibration damping part positioned downward from the center of steering with reference to a neutral position, and
   the spring constant or elastic modulus of the first vibration damping part is set lower than the spring constant or elastic modulus of the second vibration damping part.

2. The vehicle steering wheel vibration damping structure according to claim 1, wherein
   the first vibration damping part includes damping rubber arranged symmetrically on both left and right sides of the center of steering,
   the second vibration damping part includes damping rubber, and
   the hardness of the damping rubber for the first vibration damping part is lower than the hardness of the damping rubber for the second vibration damping part.

3. The vehicle steering wheel vibration damping structure according to claim 1, wherein
   a spring is attached to the steering wheel and elastically supports each of the vibration damping parts individually, and
   the spring constant of a first spring elastically supporting the first vibration damping part is set lower than the spring constant of a second spring elastically supporting the second vibration damping part.

4. The vehicle steering wheel vibration damping structure according to claim 1, wherein
   deadweight is provided on the airbag module side positioned at or near an installation height of the second vibration damping part.

5. The vehicle steering wheel vibration damping structure according to claim 4, wherein
   the deadweight is provided below the installation height position of the second vibration damping part instead of at the installation height position of the second vibration damping part.

6. The vehicle steering wheel vibration damping structure according to claim 1, wherein
   the airbag module further has a module base on which the vibration damping parts are attached, and
   the module base is formed such that an upper region above the center of steering is lighter than a lower region, with reference to the neutral position of the steering wheel.

7. The vehicle steering wheel vibration damping structure according to claim 6, wherein
   the upper region of the module base is made out of synthetic resin, and the lower region is made out of metal.

8. A vehicle steering wheel device comprising the vehicle steering wheel vibration damping structure according to claim 1.

* * * * *